US012105250B2

(12) United States Patent
Zhao et al.

(10) Patent No.: US 12,105,250 B2
(45) Date of Patent: Oct. 1, 2024

(54) METHOD FOR CALIBRATING DAILY PRECIPITATION FORECAST BY USING BERNOULLI-GAMMA-GAUSSIAN DISTRIBUTION

(71) Applicant: SUN YAT-SEN UNIVERSITY, Guangdong (CN)

(72) Inventors: Tongtiegang Zhao, Guangdong (CN); Zeqing Huang, Guangdong (CN)

(73) Assignee: SUN YAT-SEN UNIVERSITY, Guangdong (CN)

( * ) Notice: Subject to any disclaimer, the term of this patent is extended or adjusted under 35 U.S.C. 154(b) by 94 days.

(21) Appl. No.: 17/793,050

(22) PCT Filed: Apr. 16, 2021

(86) PCT No.: PCT/CN2021/087676
§ 371 (c)(1),
(2) Date: Jul. 15, 2022

(87) PCT Pub. No.: WO2022/217568
PCT Pub. Date: Oct. 20, 2022

(65) Prior Publication Data
US 2023/0152488 A1    May 18, 2023

(51) Int. Cl.
*G01W 1/18* (2006.01)
*G01W 1/10* (2006.01)
(Continued)

(52) U.S. Cl.
CPC ............. *G01W 1/18* (2013.01); *G01W 1/10* (2013.01); *G01W 1/14* (2013.01); *G06F 17/18* (2013.01)

(58) Field of Classification Search
CPC . G01W 1/18; G01W 1/10; G01W 1/14; G06F 17/18
See application file for complete search history.

(56) References Cited

U.S. PATENT DOCUMENTS

2008/0097701 A1    4/2008  Zawadzki et al.
2016/0299255 A1*  10/2016  Dail ..................... G01N 21/31

FOREIGN PATENT DOCUMENTS

CA    2558887     3/2008
CN    106991278    7/2017
(Continued)

OTHER PUBLICATIONS

WO-2016164147-A1_Translated (Year: 2016).*
"International Search Report (Form PCT/ISA/210) of PCT/CN2021/087676," mailed on Jan. 21, 2022, pp. 1-5.

*Primary Examiner* — Manish S Shah
*Assistant Examiner* — Michael J Singletary
(74) *Attorney, Agent, or Firm* — JCIPRNET

(57) ABSTRACT

The present disclosure provides a method for calibrating daily precipitation forecast by using a Bernoulli-Gamma-Gaussian distribution, including the following steps: acquiring daily raw forecast data and observed data; using a Bernoulli distribution to perform precipitation occurrence analysis; using a Gamma distribution to perform precipitation amount analysis on the data that precipitation occurs; using a Gaussian distribution to perform normal transformation on the raw forecast data and the observed data according to the analysis results of the Bernoulli distribution and the Gamma distribution, and obtaining corresponding normalized variables; constructing a bivariate joint normal distribution; constructing a conditional probability distribution of a predictand; and determining whether a forecast to be calibrated is that a precipitation event occurs, determining a conditional probability distribution parameter of the predictand, then randomly sampling the conditional probability distribution of the predictand, and finally obtaining the calibrated forecast by means of inverse normal quantile transform.

16 Claims, 8 Drawing Sheets

(51) Int. Cl.
*G01W 1/14* (2006.01)
*G06F 17/18* (2006.01)

(56) References Cited

FOREIGN PATENT DOCUMENTS

| | | | |
|---|---|---|---|
| CN | 109814178 | 5/2019 | |
| CN | 110263293 | 9/2019 | |
| CN | 112415635 | 2/2021 | |
| WO | WO-2016164147 A1 * | 10/2016 | ............. A01B 76/00 |

* cited by examiner

METHOD FOR CALIBRATING DAILY PRECIPITATION FORECAST BY USING BERNOULLI-GAMMA-GAUSSIAN DISTRIBUTION

CROSS-REFERENCE TO RELATED APPLICATION

This application is a 371 of international application of PCT application serial no. PCT/CN2021/087676, filed on Apr. 16, 2021. The entirety of each of the above mentioned patent applications is hereby incorporated by reference herein and made a part of this specification.

TECHNICAL FIELD

The present invention relates to the technical field of hydrologic forecast calibration, and more particularly to a method for calibrating daily precipitation forecast by using a Bernoulli-Gamma-Gaussian distribution.

BACKGROUND

Precipitation is a key link of hydrologic circulation. With the steady development of a global climate model, the global climate model can provide rich daily precipitation forecast information, and provide important reference for the management of watershed water resources and the implementation of flood control and drought fight work. Affected by the structure, parameters, initial and boundary conditions of the global climate model, a raw forecast generated thereby generally contains complex systematic errors and random errors, which is adverse to the engineering application of precipitation forecast. Therefore, at present, the precipitation forecast is calibrated mainly by fitting and analyzing monthly precipitation data by means of Gamma distribution.

However, for daily precipitation data, due to the non-negativity thereof, the daily precipitation data is in a complex skew and discrete-continuous mixed distribution, which brings difficulties to modeling and analysis. Under natural conditions, precipitation is non-negative, that is, precipitation amount does not have a negative value, and the minimum value thereof is zero. In conventional monthly precipitation modeling and analysis, in addition to an extremely droughty region, monthly precipitation generally does not contain the value zero, and the distribution thereof can be considered as an ordinary continuous distribution. Different from monthly precipitation, daily precipitation generally contains a certain amount of the value zero; therefore, the precipitation amount distribution is not a simple continuous distribution, but a discrete-continuous mixed distribution. Gamma distribution has no definition at the point zero. Therefore, daily precipitation cannot be directly modeled and analyzed by means of Gamma distribution, and daily precipitation forecast would be difficult to be calibrated.

SUMMARY OF THE INVENTION

In order to overcome the defect in the prior art that daily precipitation forecast is difficult to be analyzed and calibrated due to a skew and discrete-continuous mixed distribution of daily precipitation data, the present invention provides a method for calibrating daily precipitation forecast by using a Bernoulli-Gamma-Gaussian distribution.

In order to solve the above technical problem, the technical solution of the present invention is as follows:

A method for calibrating daily precipitation forecast by using a Bernoulli-Gamma-Gaussian distribution, including the following steps:

S1, acquiring raw forecast data of daily average precipitation in a watershed area and corresponding observed data of the average precipitation in the watershed area;

S2, using a Bernoulli distribution to perform precipitation occurrence analysis on the raw forecast data and the observed data;

S3, using a Gamma distribution to perform precipitation amount analysis on the raw forecast data and the observed data that precipitation occurs;

S4, performing normal transformation on the raw forecast data and the observed data according to the analysis results of the Bernoulli distribution and the Gamma distribution, and obtaining normalized variables $\hat{F}$ and $\hat{O}$ corresponding to the raw forecast data and the observed data;

S5, constructing a bivariate joint normal distribution according to the normalized variables $\hat{F}$ and $\hat{O}$;

S6, using the normalized variable $\hat{F}$ of the raw forecast data as a predictor and using the normalized variable $\hat{O}$ of the observed data as a predictand to construct a conditional probability distribution of the predictand $\hat{O}$; and S7, determining whether forecast data to be calibrated is that a precipitation event occurs, determining the conditional probability distribution of the predictand $\hat{O}$, further randomly sampling the conditional probability distribution of the predictand $\hat{O}$, and finally obtaining the calibrated forecast according to inverse normal quantile transform.

As a preferred solution, the step of using the Bernoulli distribution to perform precipitation occurrence analysis on the raw forecast data and the observed data includes:

S2.1, setting a raw forecast data threshold $T_f$ and an observed data threshold $T_o$, and determining whether a precipitation event occurs: if the precipitation amount of the raw forecast data and the precipitation amount of the observed data are less than the corresponding thresholds $T_f$ and $T_o$, then determining that no precipitation event occurs; and if the precipitation amount of the raw forecast data and the precipitation amount of the observed data are greater than or equal to the corresponding thresholds $T_f$ and $T_o$, then determining that a precipitation event occurs;

S2.2, calculating probabilities $q_f$ and $q_o$ of the raw forecast data and the observed data that no precipitation event occurs according to the precipitation event occurrence determination result, wherein the calculation formula thereof is as follows:

$$q = K_0/K$$

Wherein $K_0$ denotes the number of the data samples that no precipitation event occurs, and K denotes the total number of the data samples; and performing Bernoulli distribution fitting according to the probability that no precipitation event occurs, wherein the expression formula thereof is as follows:

$$\begin{cases} F \sim B(q_f) \\ O \sim B(q_o) \end{cases}$$

Wherein $F=[f_1, f_2, \ldots, f_K]$ denotes the raw forecast data; $O=[o_1, o_2, \ldots, o_K]$ denotes the observed data; and $B(\ )$ denotes the Bernoulli distribution.

As a preferred solution, the step of using a Gamma distribution to perform precipitation amount analysis on the raw forecast data and the observed data that precipitation occurs includes:

Recording raw forecast data samples which are analyzed to occur a precipitation event as $F_c$, recording observed data samples which are analyzed to occur a precipitation event as $O_c$, using the Gamma distribution to respectively fit the raw forecast data samples $F_c$ and the observed data samples $O_c$, and obtaining marginal distributions thereof, wherein the expression formulas thereof are as follows:

$$\begin{cases} F_c \sim G(\alpha_f, \beta_f) \\ O_c \sim G(\alpha_o, \beta_0) \end{cases}$$

Wherein $G(\ )$ denotes the Gamma distribution, and $\alpha_f$, $\beta_f$, $\alpha_o$, and $\beta_o$ respectively denote Gamma distribution parameters of the raw forecast data and the observed data obtained by means of fitting.

As a preferred solution, the step of performing normal transformation on the raw forecast data and the observed data includes:

S4.1, transforming the raw forecast data and the observed data into corresponding cumulative distribution function values according to the analysis results of the Bernoulli distribution and the Gamma distribution, wherein the calculation formula thereof is as follows:

$$\begin{cases} P_{f_i} = m_f + (1 - m_f) CDF_{(\alpha_f, \beta_f)}(f_i) \\ P_{o_i} = m_o + (1 - m_o) CDF_{(\alpha_o, \beta_o)}(o_i) \end{cases}$$

Wherein $P_{f_i}$ and $P_{o_i}$ denote the cumulative distribution function values of the raw forecast data $f_i$ and the observed data $o_i$ in an i-th year, and $i=1,2, \ldots, K$; $CDF_{(\alpha_f, \beta_f)}$ and $CDF_{(\alpha_o, \beta_o)}$ respectively denote cumulative distribution functions of the Gamma distribution of the raw forecast data and the observed data; and $m_f$ and $m_o$ respectively denote the cumulative distribution function values of the raw forecast data and the observed data that no precipitation event occurs;

S4.2, transforming the cumulative distribution function values $P_{f_i}$ and $P_{o_i}$ into variables obeying a standard normal distribution by means of an inverse function of the cumulative distribution function in the standard normal distribution, wherein the expression formula thereof is as follows:

$$\begin{cases} \hat{f}_i = CDF'_{N(0,1^2)}(P_{f_i}) \\ \hat{o}_i = CDF'_{N(0,1^2)}(P_{o_i}) \end{cases}$$

Wherein $CDF'_{N(0,1^2)}(\ )$ denotes the inverse function of the cumulative distribution function in the standard normal distribution; and $\hat{f}_i$ and $\hat{o}_i$ respectively denote the variable of raw forecast and the variable of observation which were normal quantile transformed; therefore, the normalized variable $\hat{F}=[\hat{f}_1, \hat{f}_2, \ldots, \hat{f}_K]$ of the raw forecast data and the normalized variable $\hat{O}=[\hat{o}_1, \hat{o}_2, \ldots, \hat{o}_K]$ of the observed data obey normal distribution.

As a preferred solution, the expression formula of the bivariate joint normal distribution of the normalized variables $\hat{F}$ and $\hat{O}$ is as follows:

$$\begin{bmatrix} \hat{F} \\ \hat{O} \end{bmatrix} \sim \left( \begin{bmatrix} 0 \\ 0 \end{bmatrix}, \begin{bmatrix} 1 & \rho \\ \rho & 1 \end{bmatrix} \right)$$

Wherein $\rho$ denotes a correlation coefficient of the normalized variables $\hat{F}$ and $\hat{O}$.

As a preferred solution, the correlation coefficient $\rho$ of the normalized variables $\hat{F}$ and $\hat{O}$ is calculated with a maximum likelihood estimation method, wherein the calculation formula of a likelihood equation L is as follows:

$$L = \prod_{i=1}^{K} l_i$$

Wherein $l_i$ denotes a likelihood function of the raw forecast data $f_i$ and the observed data $o_i$ in the i-th year; and the expression formula of the likelihood equation l is as follows:

$$\begin{cases} l = PDF_{BN} = \dfrac{1}{2\pi\sqrt{1-\rho^2}} e^{-\frac{1}{2(1-\rho^2)}\left[\hat{f}^2 - 2\rho\hat{f}\hat{o} + \hat{o}^2\right]} & \text{if } \hat{f} > \hat{f}_T, \hat{o} > \hat{o}_T \\[4pt] l = \dfrac{1}{\sqrt{2\pi}} e^{-\frac{\hat{f}^2}{2}} CDF_{\rho\hat{f}, 1-\rho^2}(\hat{o}_T) & \text{if } \hat{f} > \hat{f}_T, \hat{o} \leq \hat{o}_T \\[4pt] l = \dfrac{1}{\sqrt{2\pi}} e^{-\frac{\hat{o}^2}{2}} CDF_{\rho\hat{o}, 1-\rho^2}(\hat{f}_T) & \text{if } \hat{f} \leq \hat{f}_T, \hat{o} > \hat{o}_T \\[4pt] l = CDF_{BN}(\hat{f}_T, \hat{o}_T) & \text{if } \hat{f} \leq \hat{f}_T, \hat{o} \leq \hat{o}_T \end{cases}$$

Wherein $PDF_{BN}$ denotes a probability density function of the standard bivariate joint normal distribution; $CDF_{\rho\hat{f}, 1-\rho^2}(\ )$ and $CDF_{\rho\hat{o}, 1-\rho^2}(\ )$ respectively denote cumulative distribution functions of the conditional probability distributions of normalized forecasts and normalized observations in the bivariate joint normal distribution; $CDF_{BN}(\ )$ denotes a cumulative distribution function in a standard bivariate joint normal distribution; $\hat{f}_T$ and $\hat{o}_T$ denote the normal distribution variables corresponding to the thresholds $T_f$ and $T_o$.

As a preferred solution, in the likelihood equation L, a golden selection search algorithm is used to calculate a value of the correlation coefficient when the likelihood equation achieves a maximum value.

As a preferred solution, by using the normalized variable $\hat{F}=[\hat{f}_1, \hat{f}_2, \ldots, \hat{f}_K]$ of the raw forecast data as a predictor and using the normalized variable $\hat{O}=[\hat{o}_1, \hat{o}_2, \ldots, \hat{o}_K]$ of the observed data as a predictand, the expression formula of the conditional probability distribution of the predictand $\hat{O}$ is obtained as follows:

$$\begin{cases} \hat{o} \mid \hat{f}: N(\rho\hat{f}, 1-\rho^2) & \text{if } \hat{f} > \hat{f}_T \\ \hat{o} \mid \hat{f}: N(\rho\hat{f}_r, 1-\rho^2) & \text{if } \hat{f} \leq \hat{f}_T \end{cases}$$

Wherein $\rho$ denotes the correlation coefficient of the normalized variables $\hat{F}$ and $\hat{O}$; $\hat{f}_r$ denotes a group of random numbers randomly sampled from the standard normal distribution $N(0,1^2)$ and less than or equal to $\hat{f}_T$.

As a preferred solution, the step of randomly sampling the corresponding the forecast data according to the conditional probability distribution and then obtaining the calibrated forecast according to inverse normal quantile transform includes: performing determination according to the conditional probability distribution:

If the forecast data to be calibrated $\hat{f} > \hat{f}_T$, that is, if the forecast data to be calibrated $\hat{f}$ is that a precipitation event occurs, then directly calculating a conditional probability distribution parameter of the predictand $\hat{o}$, so as to determine the conditional probability distribution $N(\rho\hat{f},1-\rho^2)$ of the predictand ô; then randomly sampling the conditional probability distribution of the predictand ô, and finally obtaining the calibrated forecast according to inverse normal quantile transform; and If the forecast data to be calibrated $\hat{f} \leq \hat{f}_T$, that is, if the forecast data to be calibrated $\hat{f}$ is that no precipitation event occurs, then first randomly sampling the standard normal distribution $N(0,1^2)$ to obtain a group of normal distribution random numbers $\hat{f}_r$ less than or equal to $\hat{f}_T$, and then calculating the conditional probability distribution parameter of the predictand ô according to the value of each of $\hat{f}_r$, so as to determine the conditional probability distribution $N(\rho\hat{f}_r,1-\rho^2)$ of the predictand ô; randomly sampling the conditional probability distribution of the predictand ô, sequentially performing the same calculation on each of $\hat{f}_r$, and finally collecting all the samples and obtaining the calibrated forecast by means of inverse normal quantile transform.

As a preferred solution, the method further includes the following step: calculating a forecast bias, reliability and skill according to the calibrated forecast result as verification metrics to check a daily precipitation forecast calibration result.

Compared with the prior art, the beneficial effects of the technical solution of the present invention are: by combining Bernoulli distribution and Gamma distribution to model and analyze precipitation occurrence and precipitation amount, and then by combining Gaussian distribution to perform normal quantile transform on the daily precipitation in a skew distribution, the present invention can calibrate the daily precipitation forecast characterized by the skew distribution and the discrete-continuous mixed distribution, and can effectively improve the predictive performance of the daily precipitation forecast.

DETAILED DESCRIPTION OF EMBODIMENTS

The drawings are used for illustrative purpose only, but should not be considered as a limitation to the present patent.

For a person skilled in the art, that certain commonly known structures in the figures and the descriptions thereof may be omitted is understandable.

The technical solution of the present invention will be further described below with reference to the accompanying drawings and embodiments.

EMBODIMENT

Figure 1:
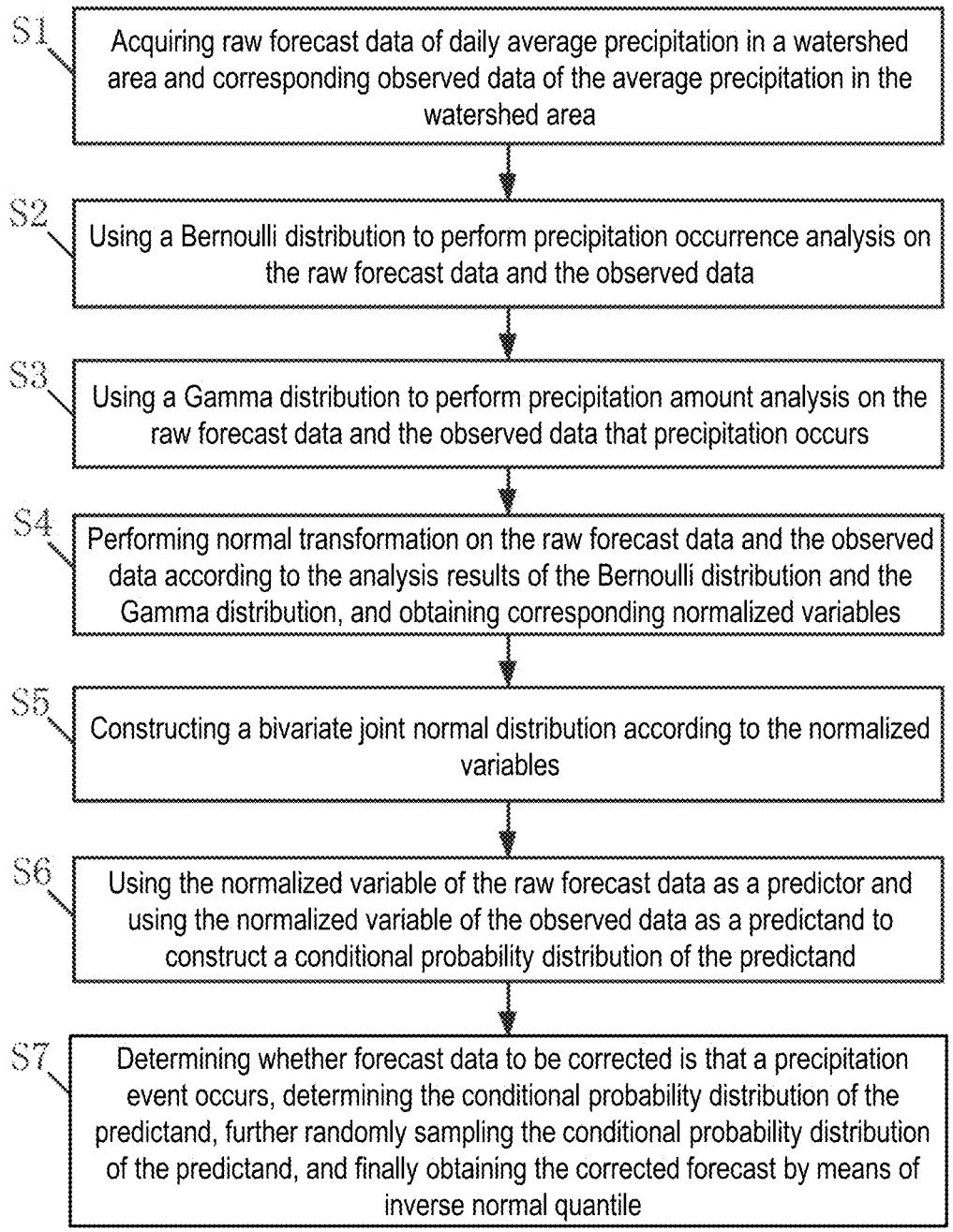
FIG. 1 is a flow chart of a method for calibrating daily precipitation forecast by using a Bernoulli-Gamma-Gaussian distribution according to the present invention.
Figure 2:
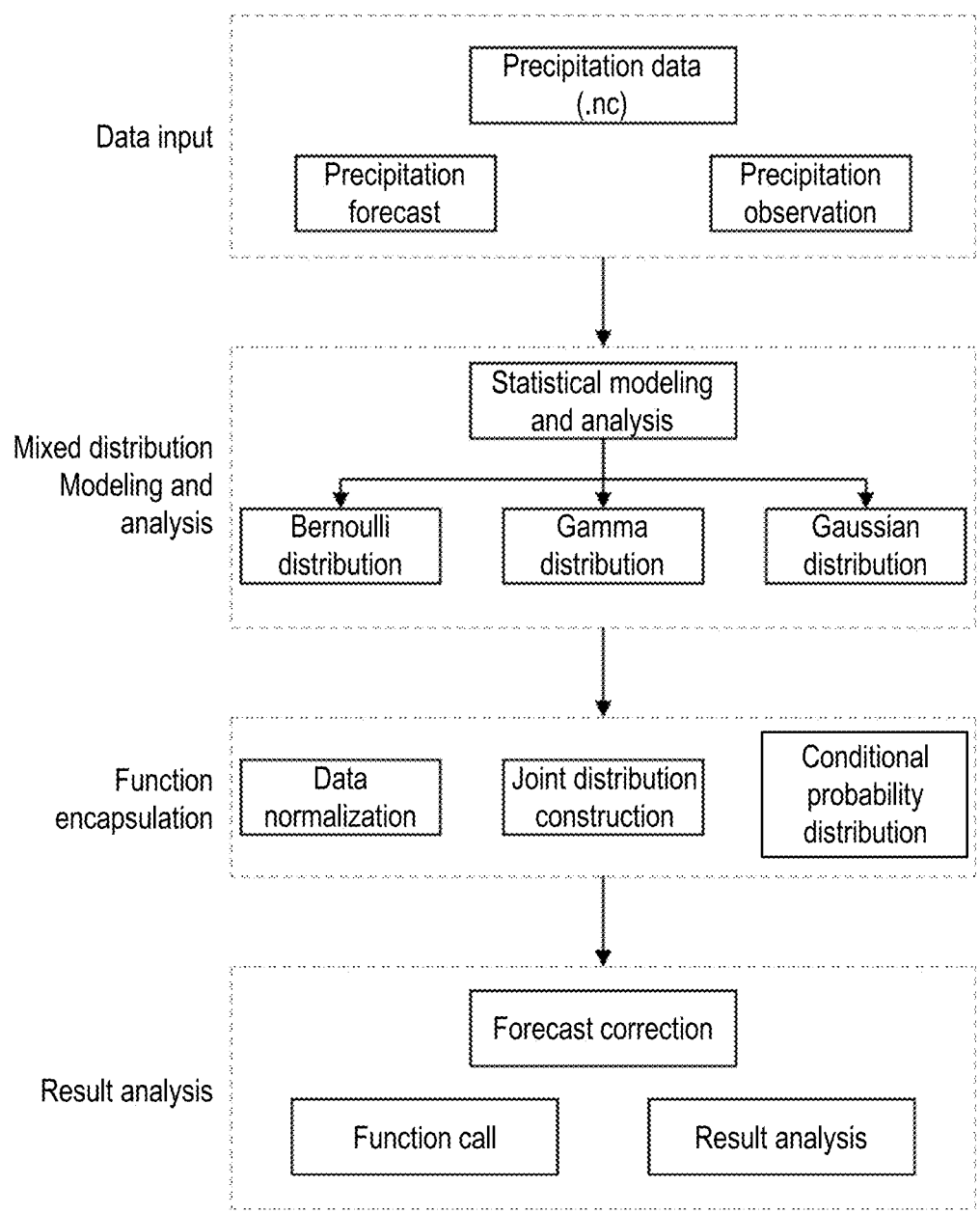
FIG. 2 is a schematic diagram of the method for calibrating daily precipitation forecast by using a Bernoulli-Gamma-Gaussian distribution according to one embodiment.

The present embodiment provides a method for calibrating daily precipitation forecast by using a Bernoulli-Gamma-Gaussian distribution. FIGS. 1-2 show flow charts of the method for calibrating daily precipitation forecast by using a Bernoulli-Gamma-Gaussian distribution according to the present embodiment.

The method for calibrating daily precipitation forecast by using a Bernoulli-Gamma-Gaussian distribution provided in the present embodiment includes the following steps:

Step 1, acquiring raw forecast data of daily average precipitation in a watershed area and corresponding observed data of the average precipitation in the watershed area.

In the present embodiment, the raw forecast data and the observed data are acquired by reading a third party library. The present embodiment performs statistical modeling and analysis according to the acquired or read raw forecast data and observed data of average precipitation in the watershed area, uses the Bernoulli distribution to analyze the precipitation occurrence process, and uses the Gamma distribution to analyze the precipitation amount in the precipitation event.

Step 2, using a Bernoulli distribution to perform precipitation occurrence analysis on the raw forecast data and the observed data.

In the present embodiment, "whether a precipitation event occurs" is regarded as a random variable; the variable has two possible values: if it is determined that a precipitation event occurs, the variable value is 1; and if it is determined that no precipitation event occurs, the variable value is 0. Therefore, the precipitation occurrence analysis process can be regarded as a Bernoulli test, and the precipitation occurrence process can be analyzed by using a Bernoulli distribution. The specific steps include:

S2.1, setting a raw forecast data threshold $T_f$ and an observed data threshold $T_o$, and determining whether a precipitation event occurs: if the precipitation amount of the raw forecast data and the precipitation amount of the observed data are less than the corresponding thresholds $T_f$ and $T_o$, then determining that no precipitation event occurs; and if the precipitation amount of the raw forecast data and the precipitation amount of the observed data are greater than or equal to the corresponding thresholds $T_f$ and $T_o$, then determining that a precipitation event occurs; wherein the thresholds $T_f$ and $T_o$ are 0 or a real number slightly greater than 0.

S2.2, calculating probabilities $q_f$ and $q_o$ (namely a failure probability in the Bernoulli distribution) of the raw forecast data and the observed data that no precipitation event occurs according to the precipitation event occurrence determination result, wherein the calculation formula thereof is as follows:

$$q = K_0/K$$

Wherein $K_0$ denotes the number of the data samples that no precipitation event occurs, and K denotes the total number of the data samples; and performing Bernoulli distribution fitting according to the probability that no precipitation event occurs, wherein the expression formula thereof is as follows:

$$\begin{cases} F \sim B(q_f) \\ O \sim B(q_o) \end{cases}$$

Wherein F=[$f_1, f_2, \ldots, f_K$] denotes the raw forecast data; O=[$o_1, o_2, \ldots, o_K$] denotes the observed data; and B( ) denotes the Bernoulli distribution.

Step 3, using a Gamma distribution to perform precipitation amount analysis on the raw forecast data and the observed data that precipitation occurs. The specific steps include:

Recording raw forecast data samples which are analyzed to be that a precipitation event occurs as $F_c$, recording observed data samples which are analyzed to be that a precipitation event occurs as $O_c$, wherein the samples $F_c$ and $O_c$ denote the precipitation amount in each precipitation event; using the Gamma distribution to respectively fit the raw forecast data samples $F_c$ and the observed data samples $O_c$, and obtaining marginal distributions thereof, wherein the expression formulas thereof are as follows:

$$\begin{cases} F_c \sim G(\alpha_f, \beta_f) \\ O_c \sim G(\alpha_o, \beta_o) \end{cases}$$

Wherein G( ) denotes the Gamma distribution, and $\alpha_f$, $\beta_f$, $\alpha_o$, and $\beta_o$ respectively denote Gamma distribution parameters of the raw forecast data and the observed data obtained by means of fitting, wherein the Gamma distribution parameters are calculated with the maximum likelihood estimation method.

Step 4, performing normal transformation on the raw forecast data and the observed data according to the analysis results of the Bernoulli distribution and the Gamma distribution, and obtaining normalized variables $\hat{F}$ and $\hat{O}$ corresponding to the raw forecast data and the observed data.

In the present step, a daily precipitation forecast calibration model based on the Bernoulli-Gamma-Gaussian distribution is constructed by combining the analysis results of the Bernoulli distribution and the Gamma distribution with the Gaussian distribution. The specific steps of using Gaussian distribution to perform normal transformation on the raw forecast data and the observed data are as follows:

S4.1, transforming the raw forecast data and the observed data into corresponding cumulative distribution function values according to the analysis results of the Bernoulli distribution and the Gamma distribution, wherein the calculation formula thereof is as follows:

$$\begin{cases} P_{f_i} = m_f + (1 - m_f) CDF_{(\alpha_f, \beta_f)}(f_i) \\ P_{o_i} = m_o + (1 - m_o) CDF_{(\alpha_o, \beta_o)}(o_i) \end{cases}$$

Wherein $P_{f_i}$ and $P_{o_i}$ denote the cumulative distribution function values of the raw forecast data $f_i$ and the observed data $o_i$ in an i-th year, and i=1,2, ..., K; $CDF_{(\alpha_f, \beta_f)}$ and $CDF_{(\alpha_o, \beta_o)}$ respectively denote cumulative distribution functions of the Gamma distribution of the raw forecast data and the observed data; and $m_f$ and $m_o$ respectively denote the cumulative distribution function values of the raw forecast data and the observed data that no precipitation event occurs;

S4.2, transforming the cumulative distribution function values $P_{f_i}$ and $P_{o_i}$ into variables obeying a standard normal distribution by means of an inverse function of the cumulative distribution function in the standard normal distribution, wherein the expression formula thereof is as follows:

$$\begin{cases} \hat{f}_i = CDF'_{N(0,1^2)}(P_{f_i}) \\ \hat{o}_i = CDF'_{N(0,1^2)}(P_{o_i}) \end{cases}$$

Wherein $CDF'_{N(0,1^2)}$( ) denotes the inverse function of the cumulative distribution function in the standard normal distribution; and $\hat{f}_i$ and $\hat{o}_i$ respectively denote the raw forecast variables and the observed variables which were the normal quantile transformed; therefore, the normalized variable $\hat{F}$=[$\hat{f}_1, \hat{f}_2, \ldots, \hat{f}_K$] of the raw forecast data and the normalized variable $\hat{O}$=[$\hat{o}_1, \hat{o}_2, \ldots, \hat{o}_K$] of the observed data obey normal distribution.

In the present step, the value zero in the daily precipitation data is regarded as an unknown value less than or equal to zero, such that the discrete-continuous distribution of the precipitation is transformed into a single continuous distribution, thereby simplifying the subsequent modeling and analysis process. The step also results in censored data.

Step 5, constructing a bivariate joint normal distribution according to the normalized variables $\hat{F}$ and $\hat{O}$. The expression formula is as follows:

$$\begin{bmatrix} \hat{F} \\ \hat{O} \end{bmatrix} \sim N\left( \begin{bmatrix} 0 \\ 0 \end{bmatrix}, \begin{bmatrix} 1 & \rho \\ \rho & 1 \end{bmatrix} \right)$$

Wherein $\rho$ denotes a correlation coefficient of the normalized variables $\hat{F}$ and $\hat{O}$. Different from the monthly precipitation analysis, affected by the censored data, the correlation coefficient $\rho$ cannot be directly calculated by formula. In the present embodiment, the correlation coefficient is calculated with the maximum likelihood estimation method, wherein the calculation formula of the likelihood equation L is as follows:

$$L = \prod_{i=1}^{K} l_i$$

Wherein $l_i$ denotes a likelihood equation of the raw forecast data $f_i$ and the observed data $o_i$ in the i-th year; and the expression formula of the likelihood equation l is as follows:

$$\begin{cases} l = PDF_{BN} = \dfrac{1}{2\pi\sqrt{1-\rho^2}} e^{-\frac{1}{2(1-\rho^2)}[\hat{f}^2 - 2\rho\hat{f}\hat{o} + \hat{o}^2]} & \text{if } \hat{f} > \hat{f}_T, \hat{o} > \hat{o}_T \\ l = \dfrac{1}{\sqrt{2\pi}} e^{-\frac{\hat{f}^2}{2}} CDF_{\rho\hat{f}, 1-\rho^2}(\hat{o}_T) & \text{if } \hat{f} > \hat{f}_T, \hat{o} \leq \hat{o}_T \\ l = \dfrac{1}{\sqrt{2\pi}} e^{-\frac{\hat{o}^2}{2}} CDF_{\rho\hat{o}, 1-\rho^2}(\hat{f}_T) & \text{if } \hat{f} \leq \hat{f}_T, \hat{o} > \hat{o}_T \\ l = CDF_{BN}(\hat{f}_T, \hat{o}_T) & \text{if } \hat{f} \leq \hat{f}_T, \hat{o} \leq \hat{o}_T \end{cases}$$

Wherein $PDF_{BN}$ denotes a probability density function of the standard bivariate joint normal distribution; $CDF_{\rho\hat{f}, 1-\rho^2}$( ) and $CDF_{\rho\hat{o}, 1-\rho^2}$( ) respectively denote cumulative distribution functions of the conditional probability distributions of normalized forecasts and normalized observations in the bivariate joint normal distribution; $CDF_{BN}$( )

denotes a cumulative distribution function in a standard bivariate joint normal distribution; $\hat{f}_T$ and $\hat{o}_T$ denote the normal distribution variables corresponding to the thresholds $T_f$ and $T_o$.

The four likelihood equations 1 in the above formula respectively denote likelihood equations under four situations. The four likelihood equations from top to bottom respectively correspond to: 1) the raw forecast data and the observed data are both that a precipitation event occurs; 2) the raw forecast data is that a precipitation event occurs, and the observed data is that no precipitation event occurs; 3) the raw forecast data is that no precipitation event occurs, and the observed data is that a precipitation event occurs; and 4) the raw forecast data and the observed data are both that no precipitation event occurs.

According to the above likelihood equation L, a golden selection search algorithm is used to calculate a value of the correlation coefficient $\rho$ when the likelihood equation achieves a maximum value.

Step 6, using the normalized variable $\hat{F}$ of the raw forecast data as a predictor and using the normalized variable $\hat{O}$ of the observed data as a predictand to construct a conditional probability distribution of the predictand $\hat{O}$. Wherein the expression formula of the conditional probability distribution of the predictand $\hat{O}$ is as follows:

$$\begin{cases} \hat{o} \mid \hat{f} : N(\rho\hat{f}, 1-\rho^2) \text{ if } \hat{f} > \hat{f}_T \\ \hat{o} \mid \hat{f} : N(\rho\hat{f}_r, 1-\rho^2) \text{ if } \hat{f} \leq \hat{f}_T \end{cases}$$

Wherein $\rho$ denotes the correlation coefficient of the normalized variables $\hat{F}$ and $\hat{O}$; $\hat{f}_r$ denotes a group of random numbers randomly sampled from the standard normal distribution $N(0,1^2)$ under the condition that $\hat{f}$ is less than or equal to $\hat{f}_r$.

Step 7, determining whether forecast data to be calibrated is that a precipitation event occurs, determining the conditional probability distribution parameter of the predictand $\hat{O}$, further randomly sampling the conditional probability distribution of the predictand, and finally obtaining the calibrated forecast according to inverse normal quantile transform.

Specifically, if the forecast data to be calibrated $\hat{f} > \hat{f}_T$, that is, if the forecast data to be calibrated $\hat{f}$ is that a precipitation event occurs, then directly calculating a conditional probability distribution parameter of the predictand $\hat{o}$, so as to determine the conditional probability distribution $N(\rho\hat{f},1-\rho^2)$ of the $\hat{o}$; then randomly sampling the conditional probability distribution of the $\hat{o}$, and finally obtaining the calibrated forecast according to inverse normal quantile transform; and If the forecast data to be calibrated $\hat{f} \leq \hat{f}_T$, that is, if the forecast data to be calibrated $\hat{f}$ is that no precipitation event occurs, then first randomly sampling the standard normal distribution $N(0,1^2)$ to obtain a group of normal distribution random numbers $\hat{f}_r$ less than or equal to $\hat{f}_T$, and then calculating the conditional probability distribution parameter of the predictand $\hat{o}$ according to the value of each of $\hat{f}_r$, so as to determine the conditional probability distribution $N(\rho\hat{f}_r,1-\rho^2)$ of the predictand $\hat{o}$; randomly sampling the conditional probability distribution of the predictand $\hat{o}$, sequentially performing the same calculation on each of $\hat{f}_r$, and finally collecting all the samples and obtaining the calibrated forecast by means of inverse normal quantile transform.

Further, the method further includes: calculating a forecast bias, reliability and skill according to the calibrated forecast result as a verification metric to verify a daily precipitation forecast calibration result, and analyzing the effect of the daily precipitation forecast calibration.

In the present embodiment, by combining Bernoulli distribution and Gamma distribution to model and analyze the different processes of precipitation occurrence and the precipitation amount and then by combining Gaussian distribution to perform normal quantile transform on the daily precipitation in a skew distribution, the method can be used to calibrate the daily precipitation forecast characterized by the skew distribution and the discrete-continuous mixed distribution, and can complete the calibration of the daily precipitation forecast by acquiring the raw forecast data and the observed data only during use.

In a specific embodiment, the ECMWF-S2S daily precipitation forecast of East River in the Pearl River basin is calibrated.

First, a Dataset function in a Python third party library netCDF4 is used to read raw forecast to be calibrated and corresponding observed data (.nc); corresponding data are extracted by means of variable attributes in the object, and are respectively stored in variables named as temp_fore and temp_obs. In the present embodiment, the precipitation forecast data is cumulative precipitation amount in a seven-day forecast period forecast at the beginning of January to December, and the observed data is the observed cumulative precipitation amount corresponding to the forecast.

The read raw forecast data and the observed data are modeled and analyzed: using the Bernoulli distribution to analyze precipitation occurrence probabilities in the samples, and respectively storing the probabilities in variables q_fore and q_obs; using the Gamma distribution to analyze the precipitation distribution characteristic, using a stats.gamma.fit function to fit the precipitation, and respectively storing the obtained parameters in variables para_fore and para_obs.

On such basis, the daily precipitation forecast calibration model based on the Bernoulli-Gamma-Gaussian distribution is constructed; the calibration model mainly includes normal quantile transform, joint distribution construction and conditional probability distribution, and is constructed mainly by means of third party libraries Numpy and Scipy:

1) using the functions stats.gamma.cdf and stats.norm.ppf to perform normal quantile transform on the raw forecast data and the observed data, so as to obtain forecast and observation variables obeying normal distribution, and respectively storing the forecast and observation variables in trans_fore and trans_obs;

2) constructing a bivariate joint normal distribution model, using the functions stats.norm and stats.multivariate_normal to construct a corresponding likelihood equation in a cyclic determination manner, storing the object thereof in a likelihood_function list as an objective function of the golden selection search algorithm, searching for the corresponding correlation coefficient to enable the likelihood equation to achieve a maximum value, and finally storing the corresponding correlation coefficient in the variable corr;

3) on the basis of the bivariate joint normal distribution, calculating the conditional probability distribution parameter of the observed value, wherein the standard deviation sigma can be directly calculated according to the correlation coefficient; if the forecast to be calibrated f is greater than the threshold T, then directly calculating the mean (namely the predictand), using the function stats.norm.rvs to randomly sample 1000 samples; if the forecast to be calibrated f is less than or equal to the threshold T, then first using the functions Numpy.random.uniform and stats.norm.ppf to randomly sample 1000 groups of random values of f, determining the mean (namely the predictand), and then using stats.norm.rvs to perform random sampling one by one; and 4) obtaining the calibrated forecast by means of inverse normal quantile transform according to the random samples obtained in 3).

Further, the sentences class ( ) and def ( ) in Python are used to encapsulate the above steps to form functions, including a Bernoulli_Gamma_Gaussian class, an NQT function, a bi_gaussian function, a golden_section_search function, a conditional_distribution function, a back_NQT and the like; and the functions are stored in a .py file.

The above functions are called by means of an import sentence in the Python; each group of precipitation forecast data are calibrated one by one, so as to obtain a calibrated cumulative seven-day precipitation forecast at the beginning of each month.

Figure 3:
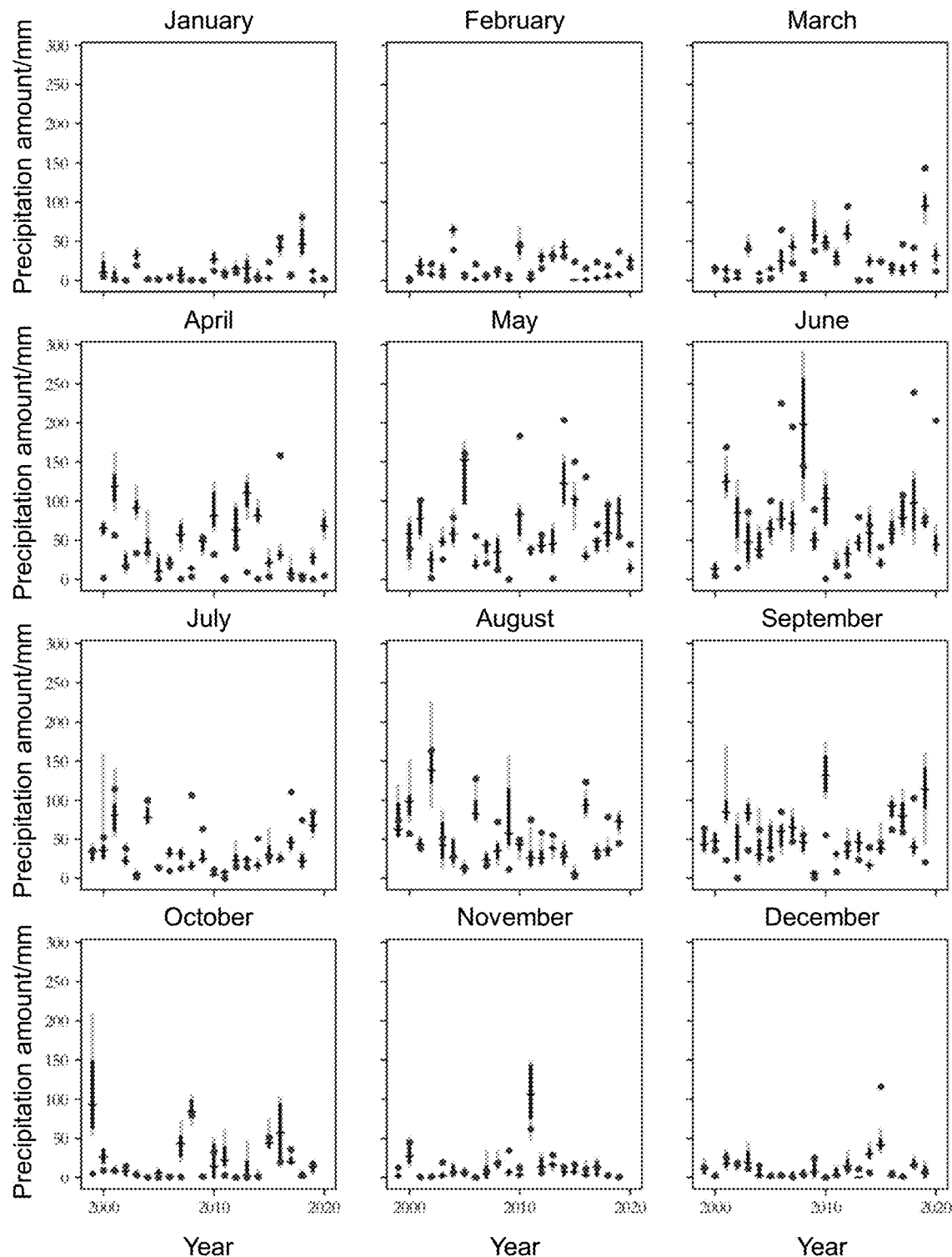
FIG. 3 is a time series diagram of raw forecast data according to one embodiment.
Figure 4:
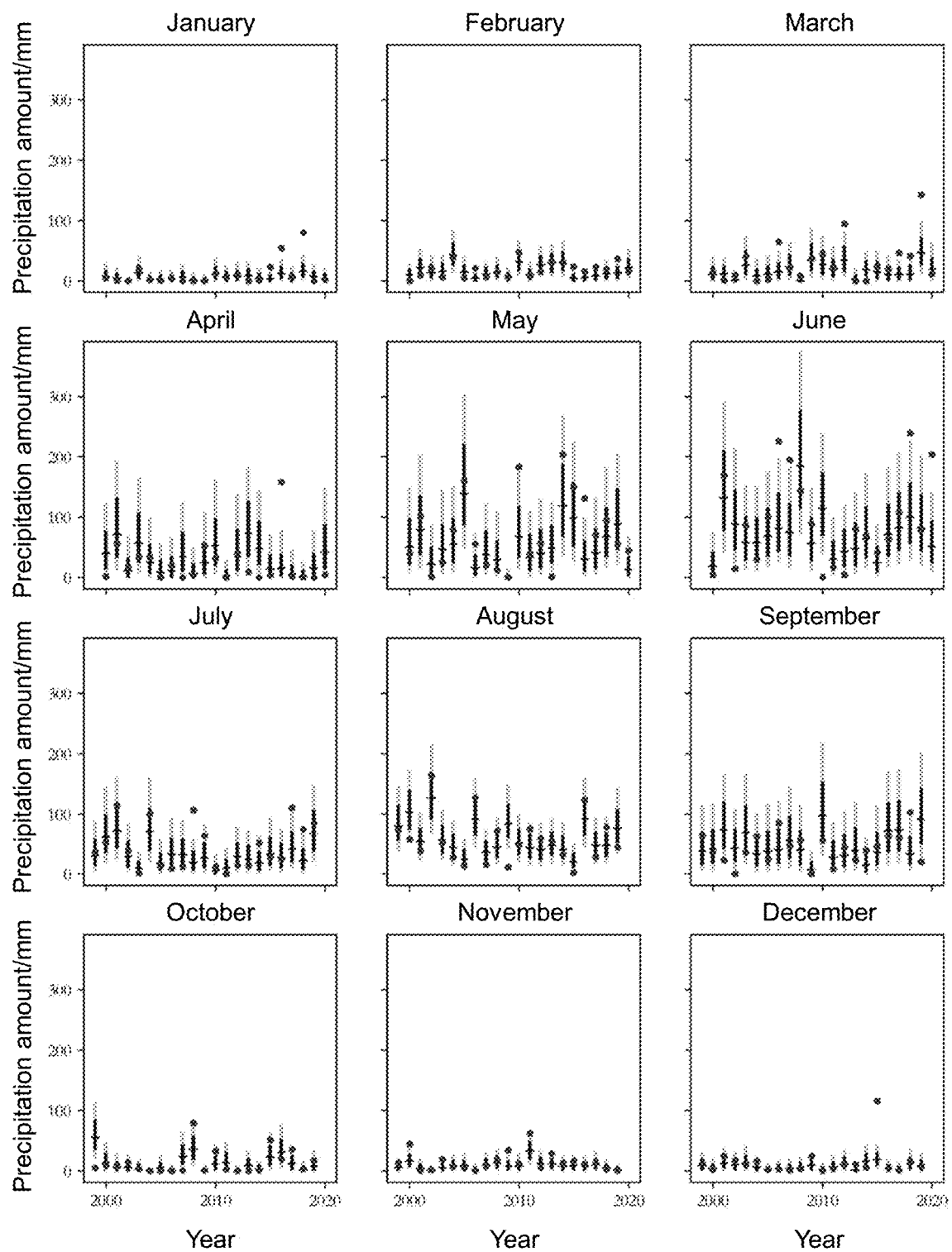
FIG. 4 is a time series diagram of calibrated forecast according to one embodiment.
Figure 5:
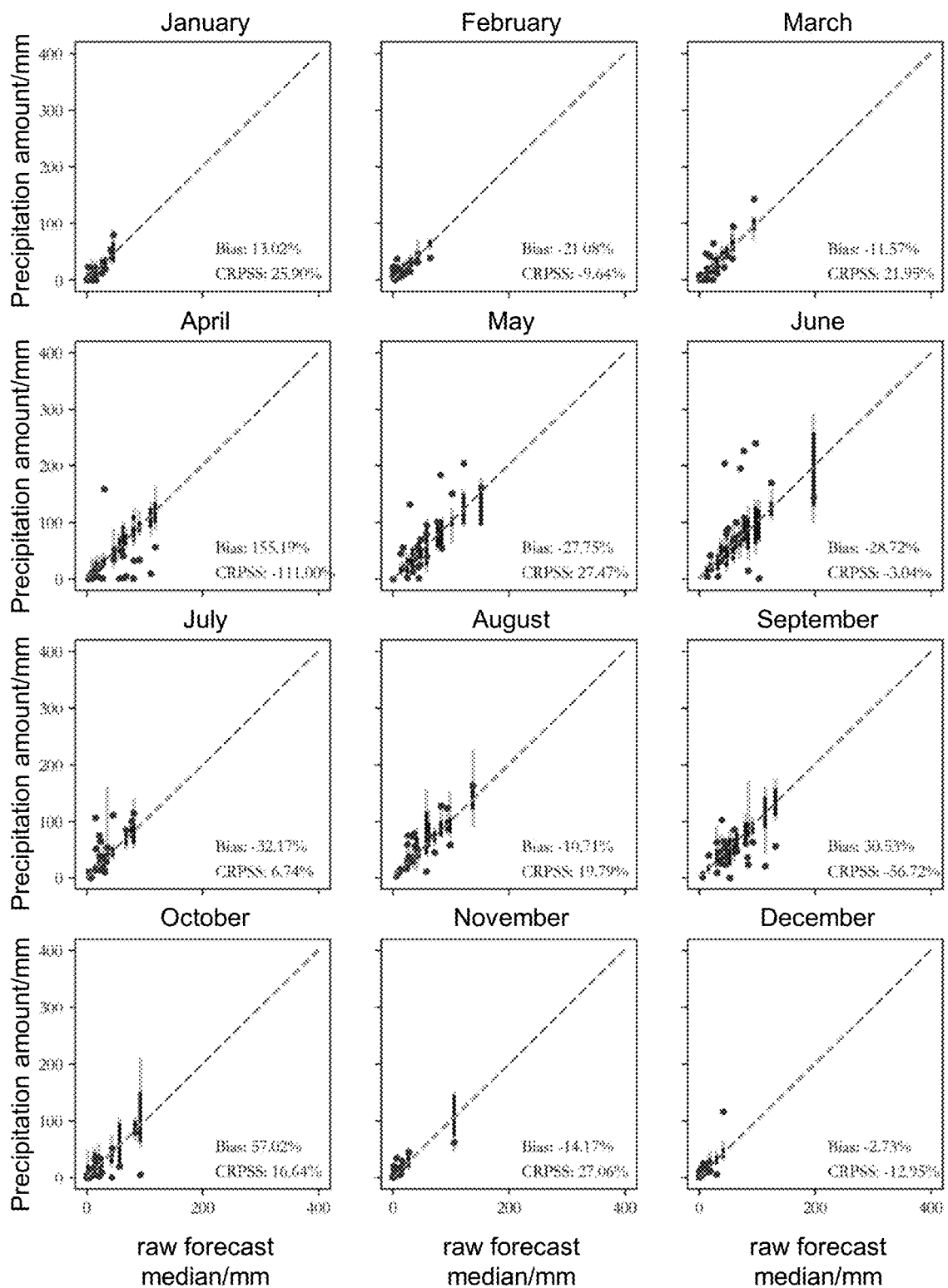
FIG. 5 is a diagnostic diagram of the raw forecast data according to one embodiment.
Figure 6:
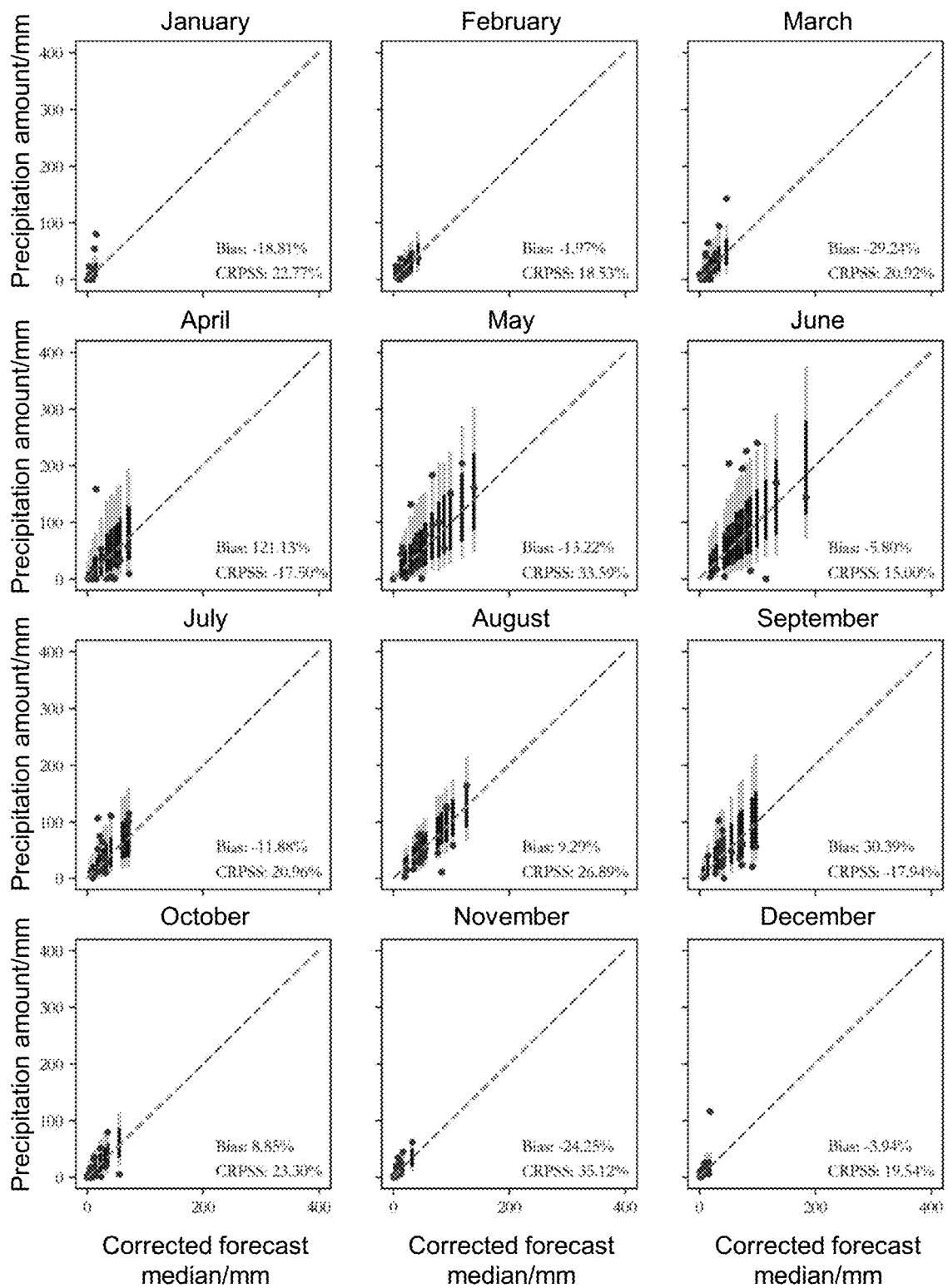
FIG. 6 is a diagnostic diagram of the calibrated forecast according to one embodiment.
Figure 7:
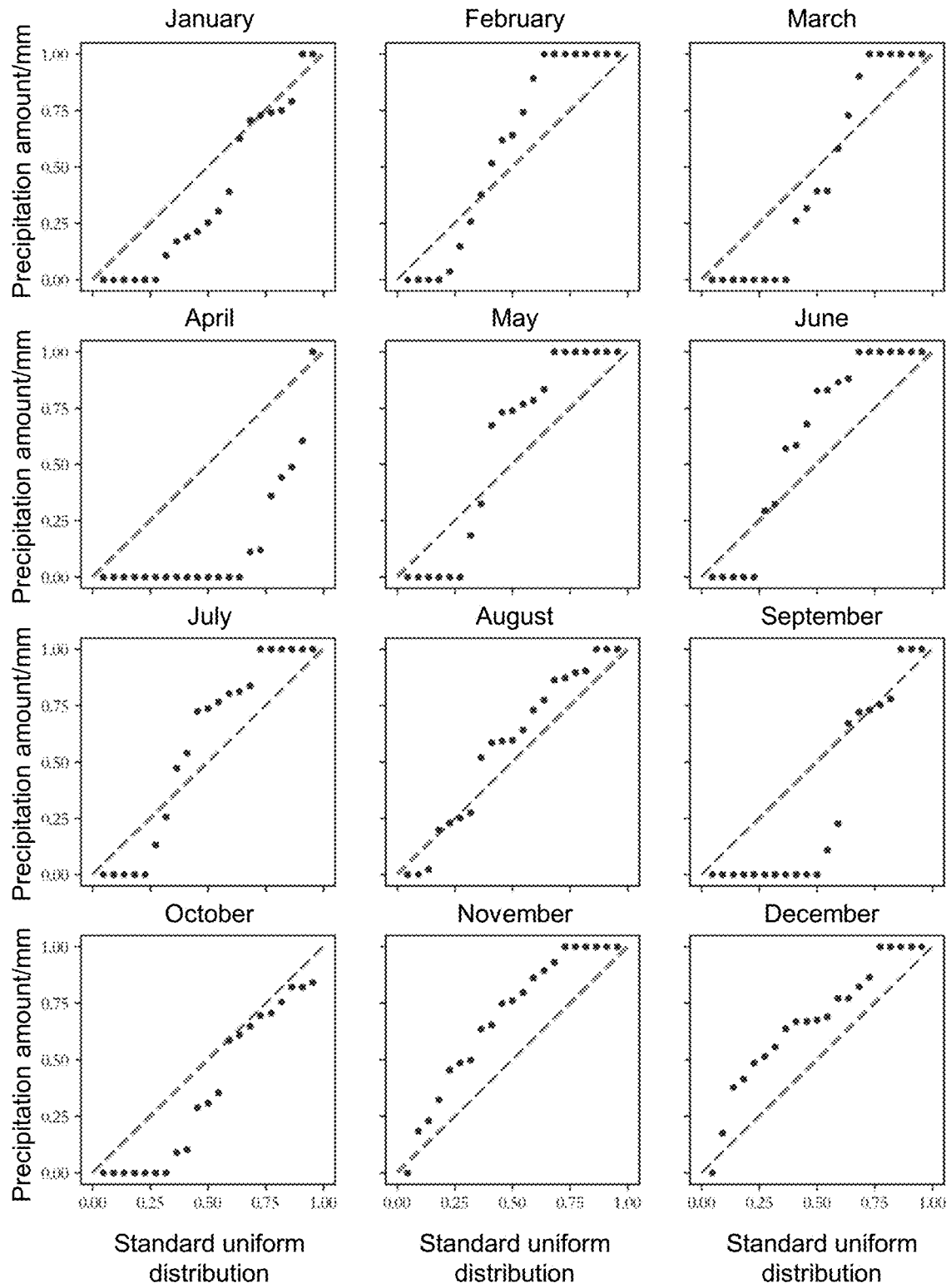
FIG. 7 is a reliability diagnosis diagram of the raw forecast data according to one embodiment.
Figure 8:
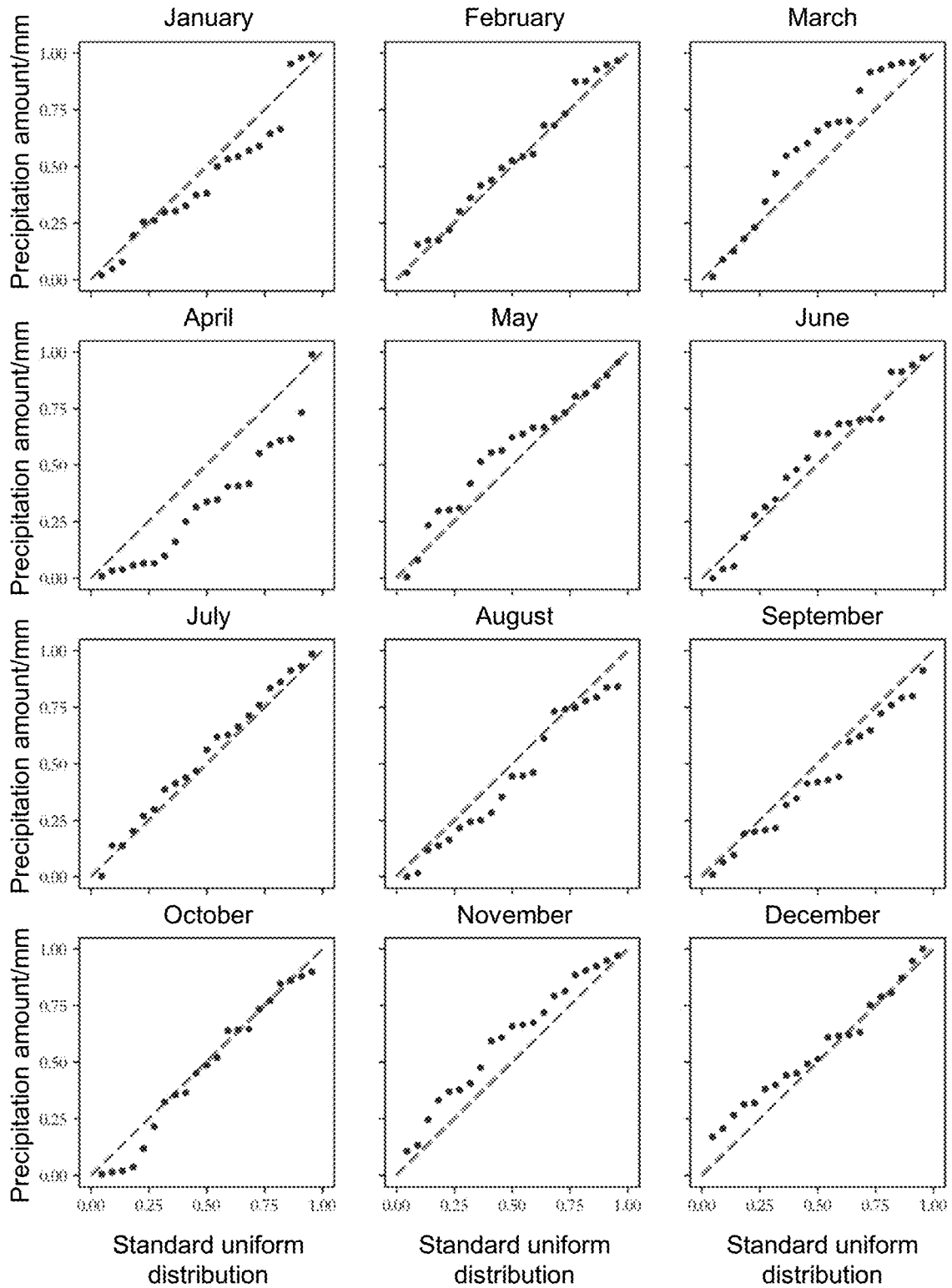
FIG. 8 is a reliability diagnosis diagram of the calibrated forecast according to one embodiment.

Further, Numpy is used to calculate the verification metrics such as forecast bias, reliability and skill and the like; and then Matplotlib is used to draw a forecast diagnosis diagram to verify the raw forecast and the calibrated forecast:

1) using the function nanpercentile in Numpy to respectively calculate the quantiles 10, 25, 50, 75, and 90 of the raw forecast and the calibrated forecast; and using the function pyplot.plot in the third party library Matplotlib to draw precipitation forecast and observation time series diagrams by taking year as the x-axis and the precipitation amount as the y-axis, as shown in FIG. 3 and FIG. 4;

2) on the basis of the quantiles 10, 25, 50, 75, and 90 of the raw forecast and the calibrated forecast, taking a median of an ensemble forecast as the x-axis and the precipitation amount as the y-axis to draw diagnostic diagrams for the raw forecast and the calibrated forecast, and using the pyplot.text to display a verification metric calculation result in the diagrams, as shown in FIG. 5 and FIG. 6; and 3) calculating a reliability verification metric PIT according to the raw forecast, the calibrated forecast, and the observed values, using the function Numpy.sort to perform sequencing in an ascending order, and taking the standard uniform distribution as the x-axis and the sequenced PIT value as the y-axis to draw a reliability diagnostic diagram, as shown in FIG. 7 and FIG. 8.

It can be seen from FIG. 3-FIG. 8 that the present embodiment can effectively calibrated a systematic precipitation forecast deviation for the daily precipitation forecast characterized by the skew distribution and the discrete-continuous mixed distribution, improves the forecast precision, thereby facilitating the engineering application of precipitation forecast. Furthermore, during use, the present invention can complete the calibration of the daily precipitation forecast only by acquiring corresponding raw forecast data and the observed data without manually setting parameters. In addition, the present embodiment encapsulates the steps of the present invention to form functions, and has good portability on the basis of an open source Python language platform, thereby facilitating the application to different systems and platforms.

It is obvious that the above embodiments of the present invention are only examples for clearly illustrating the present invention, but not limitations to the embodiments of the present invention. A person skilled in the art may make various modifications or variations in other forms on the basis of the above description. It is unnecessary and impossible to exhaust all the embodiments herein. Any modifications, equivalent substitutions, improvements and the like made within the spirit and principles of the present invention are all intended to be concluded in the scope of protection of the claims of the present invention.

What is claimed is:

1. A method for calibrating daily precipitation forecast by using a Bernoulli-Gamma-Gaussian distribution, comprising the following steps:

S1, acquiring raw forecast data of a daily average precipitation in a watershed area and corresponding observed data of an average precipitation in the watershed area;

S2, using a Bernoulli distribution to perform a precipitation occurrence analysis on the raw forecast data and observed data;

S3, using a Gamma distribution to perform a precipitation amount analysis on the raw forecast data and the observed data that precipitation occurs;

S4, performing a normal transformation on the raw forecast data and the observed data according to analysis results of the Bernoulli distribution and the Gamma distribution, and obtaining normalized variable $\hat{F}$ and normalized variable $\hat{O}$ corresponding to the raw forecast data and the observed data;

S5, constructing a bivariate joint normal distribution according to the normalized variable $\hat{F}$ and normalized variable $\hat{O}$;

S6, using the normalized variable $\hat{F}$ of the raw forecast data as a predictor and using the normalized variable $\hat{O}$ of the observed data as a predictand to construct a conditional probability distribution of the predictand $\hat{O}$; and S7, determining whether forecast data to be calibrated is that a precipitation event occurs, determining the conditional probability distribution of the predictand $\hat{O}$, further randomly sampling the conditional probability distribution of the predictand $\hat{O}$, and finally obtaining the calibrated forecast according to an inverse normal quantile transform, wherein the calibrated forecast be used in an engineering application of precipitation forecast for improving a predictive performance of a daily precipitation forecast;

wherein the step of performing the normal transformation on the raw forecast data and the observed data comprises:

S4.1, transforming the raw forecast data and the observed data into corresponding cumulative distribution function values according to the analysis results of the Bernoulli distribution and the Gamma distribution, wherein the calculation formula thereof is as follows:

$$\begin{cases} P_{f_i} = m_f + (1-m_f) CDF_{(\alpha_f, \beta_f)}(f_i) \\ P_{o_i} = m_o + (1-m_o) CDF_{(\alpha_o, \beta_o)}(o_i) \end{cases}$$

wherein $P_{f_i}$ and $P_{o_i}$ denote the cumulative distribution function values of the raw forecast data $f_i$ and the observed data $o_i$ in an i-th year, and i=1,2, ..., K; $CDF_{(\alpha_f, \beta_f)}$ and $CDF_{(\alpha_o, \beta_o)}$ respectively denote cumulative distribution functions of the Gamma distribution of the raw forecast data and the observed data; and $m_f$ and $m_o$ respectively denote the cumulative distribution function values of the raw forecast data and the observed data that no precipitation event occurs;

S4.2, transforming the cumulative distribution function values $P_{f_i}$ and $P_{o_i}$ into variables obeying a standard normal distribution by means of an inverse function of the cumulative distribution function in the standard normal distribution, wherein the expression formulas thereof are as follows:

$$\begin{cases} \hat{f}_i = CDF'_{N(0,1^2)}(P_{f_i}) \\ \hat{o}_i = CDF'_{N(0,1^2)}(P_{o_i}) \end{cases}$$

wherein $CDF'_{N(0,1^2)}()$ denotes the inverse function of the cumulative distribution function in the standard normal distribution; and $\hat{f}_i$ and $\hat{o}_i$ respectively denote a variable of raw forecast and a variable of observation which were normal quantile transformed; therefore, the normalized variable $\hat{F}=[\hat{f}_1, \hat{f}_2, \ldots, \hat{f}_K]$ of the raw forecast data and the normalized variable $\hat{O}=[\hat{o}_1, \hat{o}_2, \ldots, \hat{o}_K]$ of the observed data obey a normal distribution.

2. The method for calibrating daily precipitation forecast according to claim 1, wherein the step of using the Bernoulli distribution to perform the precipitation occurrence analysis on the raw forecast data and the observed data comprises:

S2.1, setting a raw forecast data threshold $T_f$ and an observed data threshold $T_o$, and determining whether the precipitation event occurs: if a precipitation amount of the raw forecast data and the precipitation amount of the observed data are less than the corresponding thresholds $T_f$ and $T_o$, then determining that no precipitation event occurs; and if the precipitation amount of the raw forecast data and the precipitation amount of the observed data are greater than or equal to the corresponding thresholds $T_f$ and $T_o$, then determining that the precipitation event occurs;

S2.2, calculating probabilities $q_f$ and $q_o$ of the raw forecast data and the observed data that no precipitation event occurs according to a precipitation event occurrence determination result, wherein a calculation formula thereof is as follows:

$$q = K_0/K$$

wherein $K_0$ denotes a number of the data samples that no precipitation event occurs, and K denotes a total number of the data samples; and performing a Bernoulli distribution fitting according to the probabilities that no precipitation event occurs, wherein expression formulas thereof are as follows:

$$\begin{cases} F \sim B(q_f) \\ O \sim B(q_o) \end{cases}$$

wherein $F=[f_1, f_2, \ldots, f_K]$ denotes the raw forecast data; $O=[o_1, o_2, \ldots, o_K]$ denotes the observed data; and $B()$ denotes the Bernoulli distribution.

3. The method for calibrating daily precipitation forecast according to claim 2, wherein the step of using the Gamma distribution to perform the precipitation amount analysis on the raw forecast data and the observed data that precipitation occurs comprises:

recording raw forecast data samples which are analyzed to be that the precipitation event occurs as $F_c$, recording observed data samples which are analyzed to be that the precipitation event occurs as $O_c$, using the Gamma distribution to respectively fit the raw forecast data samples $F_c$ and the observed data samples $O_c$, and obtaining marginal distributions thereof, wherein the expression formulas thereof are as follows:

$$\begin{cases} F_c \sim G(\alpha_f, \beta_f) \\ O_c \sim G(\alpha_o, \beta_o) \end{cases}$$

wherein $G()$ denotes the Gamma distribution, and $\alpha_f$, $\beta_f$, $\alpha_o$, and $\beta_o$ respectively denote Gamma distribution parameters of the raw forecast data and the observed data obtained by means of fitting.

4. The method for calibrating daily precipitation forecast according to claim 1, wherein the expression formulas of the bivariate joint normal distribution of the normalized variable $\hat{F}$ and normalized variable $\hat{O}$ is as follows:

$$\begin{bmatrix} \hat{F} \\ \hat{O} \end{bmatrix} \sim N\left(\begin{bmatrix} 0 \\ 0 \end{bmatrix}, \begin{bmatrix} 1 & \rho \\ \rho & 1 \end{bmatrix}\right)$$

wherein $\rho$ denotes a correlation coefficient of the normalized variable $\hat{F}$ and normalized variable $\hat{O}$.

5. The method for calibrating daily precipitation forecast according to claim 4, wherein the correlation coefficient $\rho$ of the normalized variable $\hat{F}$ and normalized variable $\hat{O}$ is calculated with a maximum likelihood estimation method, and the calculation formula of a likelihood equation L is as follows:

$$L = \prod_{i=1}^{K} l_i$$

wherein $l_i$ denotes a likelihood function of the raw forecast data $f_i$ and the observed data $o_i$ in the i-th year; and the expression formulas of the likelihood equation l is as follows:

$$\begin{cases} l = PDF_{BN} = \dfrac{1}{2\pi\sqrt{1-\rho^2}} e^{-\frac{1}{2(1-\rho^2)}[\hat{f}^2 - 2\rho\hat{f}\hat{o}+\hat{o}^2]} & \text{if } \hat{f} > \hat{f}_T, \hat{o} > \hat{o}_T \\ l = \dfrac{1}{\sqrt{2\pi}} e^{-\frac{\hat{f}^2}{2}} CDF_{\rho\hat{f},1-\rho^2}(\hat{o}_T) & \text{if } \hat{f} > \hat{f}_T, \hat{o} \le \hat{o}_T \\ l = \dfrac{1}{\sqrt{2\pi}} e^{-\frac{\hat{o}^2}{2}} CDF_{\rho\hat{o},1-\rho^2}(\hat{f}_T) & \text{if } \hat{f} \le \hat{f}_T, \hat{o} > \hat{o}_T \\ l = CDF_{BN}(\hat{f}_T, \hat{o}_T) & \text{if } \hat{f} \le \hat{f}_T, \hat{o} \le \hat{o}_T \end{cases}$$

wherein $PDF_{BN}$ denotes a probability density function of a standard bivariate joint normal distribution; $CDF_{\rho\hat{f},1-\rho^2}()$ and $CDF_{\rho\hat{o},1-\rho^2}()$ respectively denote the cumulative distribution functions of the conditional probability distribution of normalized forecasts and normalized observations in the bivariate joint normal distribution; $CDF_{BN}()$ denotes a cumulative distribution function in the standard bivariate joint normal distribution; $\hat{f}_T$ and $\hat{o}_T$ denote the normal distribution variables corresponding to the thresholds $T_f$ and $T_o$.

6. The method for calibrating daily precipitation forecast according to claim 5, wherein in the likelihood equation L, a golden selection search algorithm is used to calculate a value of the correlation coefficient when the likelihood equation achieves a maximum value.

7. The method for calibrating daily precipitation forecast according to claim 4, wherein by using the normalized variable $\hat{F}=[\hat{f}_1, \hat{f}_2, \ldots, \hat{f}_K]$ of the raw forecast data as a predictor and using the normalized variable $\hat{O}=[\hat{o}_1, \hat{o}_2, \ldots, \hat{o}_K]$ of the observed data as a predictand, the expression formulas of the conditional probability distribution of the predictand $\hat{O}$ is obtained as follows:

$$\begin{cases} \hat{o} | \hat{f} : N(\rho\hat{f}, 1-\rho^2) \text{ if } \hat{f} > \hat{f}_T \\ \hat{o} | \hat{f} : N(\rho\hat{f}_r, 1-\rho^2) \text{ if } \hat{f} \leq \hat{f}_T \end{cases}$$

wherein $\rho$ denotes the correlation coefficient of the normalized variable $\hat{F}$ and normalized variable $\hat{O}$; $\hat{f}_r$ denotes a group of random numbers randomly sampled from the standard normal distribution $N(0,1^2)$ under the condition that $\hat{f}$ is less than or equal to $\hat{f}_r$.

8. The method for calibrating daily precipitation forecast according to claim 7, wherein the step of randomly sampling the corresponding the forecast data according to the conditional probability distribution and then obtaining the calibrated forecast according to the inverse normal quantile transform comprises: performing determination according to the conditional probability distribution:
  if the forecast data to be calibrated $\hat{f} > \hat{f}_T$, that is, if the forecast data to be calibrated $\hat{f}$ is that the precipitation event occurs, then directly calculating a conditional probability distribution parameter of the predictand $\hat{o}$, so as to determine the conditional probability distribution $N(\rho\hat{f},1-\rho^2)$ of the predictand $\hat{o}$; then randomly sampling the conditional probability distribution of the predictand $\hat{o}$, and finally obtaining the calibrated forecast according to the inverse normal quantile transform; and
  if the forecast data to be calibrated $\hat{f} \leq \hat{f}_T$, that is, if the forecast data to be corrected $\hat{f}$ is that no precipitation event occurs, then first randomly sampling the standard normal distribution $N(0,1^2)$ to obtain a group of normal distribution random numbers $\hat{f}_r$ less than or equal to $\hat{f}_T$, and then calculating the conditional probability distribution parameter of the predictand $\hat{o}$ according to the value of each of $\hat{f}_r$, so as to determine the conditional probability distribution $N(\rho\hat{f}_r,1-\rho^2)$ of the predictand $\hat{o}$; randomly sampling the conditional probability distribution of the predictand $\hat{o}$, sequentially performing the same calculation on each of $\hat{f}_r$, and finally collecting all the samples and obtaining the calibrated forecast by means of the inverse normal quantile transform.

9. The method for calibrating daily precipitation forecast according to claim 1, wherein the method further comprises the following step: calculating a forecast bias, reliability, and skill according to the calibrated forecast result as a verification metric to verify a daily precipitation forecast calibration result.

10. The method for calibrating daily precipitation forecast according to claim 2, wherein the method further comprises the following step: calculating a forecast bias, reliability, and skill according to the calibrated forecast result as a verification metric to verify a daily precipitation forecast calibration result.

11. The method for calibrating daily precipitation forecast according to claim 3, wherein the method further comprises the following step: calculating a forecast bias, reliability, and skill according to the calibrated forecast result as a verification metric to verify a daily precipitation forecast calibration result.

12. The method for calibrating daily precipitation forecast according to claim 4, wherein the method further comprises the following step: calculating a forecast bias, reliability, and skill according to the calibrated forecast result as a verification metric to verify a daily precipitation forecast calibration result.

13. The method for calibrating daily precipitation forecast according to claim 5, wherein the method further comprises the following step: calculating a forecast bias, reliability, and skill according to the calibrated forecast result as a verification metric to verify a daily precipitation forecast calibration result.

14. The method for calibrating daily precipitation forecast according to claim 6, wherein the method further comprises the following step: calculating a forecast bias, reliability, and skill according to the calibrated forecast result as a verification metric to verify a daily precipitation forecast calibration result.

15. The method for calibrating daily precipitation forecast according to claim 7, wherein the method further comprises the following step: calculating a forecast bias, reliability, and skill according to the calibrated forecast result as a verification metric to verify a daily precipitation forecast calibration result.

16. The method for calibrating daily precipitation forecast according to claim 8, wherein the method further comprises the following step: calculating a forecast bias, reliability, and skill according to the calibrated forecast result as a verification metric to verify a daily precipitation forecast calibration result.

* * * * *